United States Patent
Edgington et al.

(10) Patent No.: US 11,566,147 B2
(45) Date of Patent: Jan. 31, 2023

(54) POLYURETHANE COATING COMPOSITION

(71) Applicant: SWIMC LLC, Cleveland, OH (US)

(72) Inventors: Garry Edgington, Fridley, MN (US); Jason Lindquist, Lino Lakes, MN (US); Tapan DebRoy, Victoria, MN (US)

(73) Assignee: SWIMC LLC, Cleveland, OH (US)

( * ) Notice: Subject to any disclaimer, the term of this patent is extended or adjusted under 35 U.S.C. 154(b) by 369 days.

(21) Appl. No.: 16/755,491

(22) PCT Filed: Oct. 4, 2018

(86) PCT No.: PCT/US2018/054333
§ 371 (c)(1),
(2) Date: Apr. 10, 2020

(87) PCT Pub. No.: WO2019/074754
PCT Pub. Date: Apr. 18, 2019

(65) Prior Publication Data
US 2021/0206997 A1    Jul. 8, 2021

Related U.S. Application Data

(60) Provisional application No. 62/571,394, filed on Oct. 12, 2017.

(51) Int. Cl.
| | | |
|---|---|---|
| *C08G 18/10* | (2006.01) | |
| *C09D 175/06* | (2006.01) | |
| *B05D 7/14* | (2006.01) | |
| *B05D 7/00* | (2006.01) | |
| *C08G 18/24* | (2006.01) | |
| *C08G 18/42* | (2006.01) | |
| *C08G 18/73* | (2006.01) | |
| *C08G 18/75* | (2006.01) | |
| *C08G 18/76* | (2006.01) | |

(52) U.S. Cl.
CPC ............ *C09D 175/06* (2013.01); *B05D 7/14* (2013.01); *B05D 7/58* (2013.01); *C08G 18/10* (2013.01); *C08G 18/246* (2013.01); *C08G 18/4277* (2013.01); *C08G 18/73* (2013.01); *C08G 18/755* (2013.01); *C08G 18/7621* (2013.01); *C08G 18/7657* (2013.01); *B05D 2420/01* (2013.01); *B05D 2420/02* (2013.01); *B05D 2420/03* (2013.01); *B05D 2503/00* (2013.01)

(58) Field of Classification Search
CPC ................................ C08G 18/10; C08G 18/73
USPC ................................. 524/590; 528/44, 72, 74
See application file for complete search history.

(56) References Cited

U.S. PATENT DOCUMENTS

| | | | |
|---|---|---|---|
| 2003/0109644 | A1 | 6/2003 | Davis et al. |
| 2003/0162892 | A1 | 8/2003 | Maier et al. |
| 2009/0246534 | A1 | 10/2009 | Staunton et al. |

FOREIGN PATENT DOCUMENTS

| | | |
|---|---|---|
| CN | 101815738 A | 8/2010 |
| CN | 101981147 A | 2/2011 |
| CN | 102365133 A | 2/2012 |
| CN | 102477251 A | 5/2012 |
| EP | 2 455 409 A2 | 5/2012 |
| WO | 02/12407 A1 | 2/2002 |
| WO | 2009035856 A1 | 3/2009 |
| WO | 2010093422 A1 | 8/2010 |
| WO | 2011045139 A1 | 4/2011 |
| WO | 2014/191503 A9 | 12/2014 |
| WO | 2017/070820 A1 | 5/2017 |

OTHER PUBLICATIONS

WO2014191503A1 machine translation; Rupert Konradi et al.; Anti-microbial polyurethane coatings: (Year: 2014).*
Chinese Search Report dated Aug. 24, 2021.
International Search Report and Written Opinion from PCT/US2018/054333, dated Jan. 13, 2019.
Extended European Search Report and European Search Opinion from EP 18 86 5935.3, dated Jun. 11, 2021.

* cited by examiner

*Primary Examiner* — Terressa Boykin
(74) *Attorney, Agent, or Firm* — Merchant & Gould P.C.

(57) ABSTRACT

A two-component polyurethane coating composition is described. The composition includes a multifunctional isocyanate component and a multifunctional polyol component. The polyurethane described herein is an overindexed composition that may be used as a tiecoat in a conventional recoat or refinish process. The described composition provides improved adhesion between an aged coat and a newly applied coating.

21 Claims, No Drawings

POLYURETHANE COATING COMPOSITION

This application is a National Stage Application of International Application No. PCT/US2018/054333, filed Oct. 4, 2018, which claims benefit of Ser. No. 62/571,394, filed Oct. 12, 2017 in the United States and which applications are incorporated herein by reference. To the extent appropriate, a claim of priority is made to each of the above disclosed applications.

BACKGROUND OF THE INVENTION

Multilayer coatings are often applied to metal substrates in various industries, including the automotive, aviation and aerospace industries, for example. These coatings are applied to retard or inhibit corrosion, and multilayer polyurethane coatings are particularly useful, as these coatings are economical and relatively easy to apply. The coatings dry quickly and have good impact resistance, making the coatings especially useful for coating metal components to be transported or shipped over large distances, for example.

When multiple coatings are used, the integrity of the coating and its ability to resist corrosion are compromised when the adjoining coatings show poor adhesion. This is particularly true when multilayer coatings are refinished or recoated. In these cases, a new coating, such as a topcoat, is applied directly over an aged coating. Some coatings, however, show poor adhesion when applied over an aged coating. For example, polyurethane topcoats do not adhere well to aged coatings, because the aged coating often has surface defects such as chalking, micropores, entrapped water, and the like, and these defects lead to poor adhesion between the new topcoat and the aged coat.

Conventionally, to improve intercoat adhesion in these multilayer coating systems, the aged coating is mechanically abraded by scuffing or sanding. The abraded surface will provide better adhesion to a subsequently applied topcoat. However, it is often inconvenient and time-consuming to sand or scuff large coated articles or substrates, and the abraded surface does not provide uniform adhesion to a subsequently applied coating. Moreover, the process of mechanically abrading the aged coating tends to release particulate matter and may have an impact on both health and the environment.

The adhesion of a polyurethane topcoat to an aged coating can be improved by the use of a tiecoat composition that will form an interlayer between the aged coating and a new coating. However, polyurethane topcoats often have small recoat windows as the topcoats tend to react with environmental moisture, and the usefulness of a polyurethane composition as a tiecoat can be limited as a result.

Accordingly, there is a need for a polyurethane-based coating system that can be used as a tiecoat to improve adhesion between an aged coating a new coating, while also extending the recoat window.

SUMMARY

In some embodiments, the present description provides a two-component polyurethane coating composition including a multifunctional isocyanate component with a plurality of reactive isocyanate groups, and an isocyanate index of at least 1.5, and a multifunctional polyol component with a plurality of reactive hydroxyl groups where the polyol has a Tg of about 25 C to −70 C The composition also includes a catalyst component capable of catalyzing the formation of an allophanate or biuret by reaction of the isocyanate component with urethane and/or urea on the surface of a coated article.

In another embodiment, the present description provides a multilayer coating system that includes a first coating and a second coating, along with a tie coat disposed between the first coating and second coating. The tie coat composition includes a least one multifunctional isocyanate component with a plurality of reactive isocyanate groups, and at least one multifunctional polyol with a plurality of reactive hydroxyl groups. A catalyst is also included.

In yet another embodiment, the present description provides a method of forming a two-component polyurethane tiecoat. The method includes steps of providing at least one multifunctional isocyanate component with a plurality of reactive isocyanate groups, providing a multifunctional polyol component, and reacting the isocyanate and polyol components in the presence of a catalyst to form the tiecoat.

In still another embodiment, the present description provides a method for improving adhesion between a first coating and a second coating applied to a substrate. The method includes steps of applying the first coating to the substrate, applying a tiecoat composition over the first coating, curing the tie coat composition, and then applying the second coating over the tie coat composition. The adhesion between the first coating and the second coating is improved relative to the same system in the absence of a tiecoat.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings as provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxyl, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "component" refers to any compound that includes a particular feature or structure. Examples of components include compounds, monomers, oligomers, polymers, and organic groups contained there.

The term "double bond" is non-limiting and refers to any type of double bond between any suitable atoms (e.g., C, O, N, etc.).

The term "triple bond" is non-limiting and refers to any type of triple bond between any suitable atoms.

The term "substantially free" of a particular component means that the compositions of the present invention contain less than 10% by weight of the component. The term "essentially free" of a particular component means that the compositions of the present invention contain less than 5% by weight of the component. The term "completely free" of a particular component means that the compositions of the present invention contain less than 1% by weight of the component.

As used herein, the term "polyol" refers to a component with two or more hydroxyl (—OH) groups. The term may refer to different types of polyols including, without limitation, polyether polyols, polyester polyols, acrylic polyols, and the like.

The term "tie coat" or "tiecoat" as used herein refers to a coating composition that may be applied to a previous coating to improve the adhesion of one or more subsequent coatings and to prevent surface defects in subsequent coatings. The terms "tiecoat," "tie coat," and "tie coating" are used interchangeably herein.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

Unless otherwise indicated, a reference to a "(meth) acrylate" compound (where "meth" is bracketed) is meant to include both acrylate and methacrylate compounds.

The term "polycarboxylic acid" includes both polycarboxylic acids and anhydrides thereof.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as grams of VOC per liter (g/L).

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present description provides a two-component polyurethane coating composition for use as a tie coat. The composition includes at least one multifunctional isocyanate component and at least one multifunctional polyester polyol along with at least one catalyst capable of catalyzing the formation of a biuret or allophanate.

In an embodiment, the two-component polyurethane coating composition described herein includes a multifunctional isocyanate component. In an aspect, the isocyanate component has a plurality of "reactive" isocyanate functional groups. The term "reactive," as used herein, refers to an isocyanate group that may react with another functional group containing one or more active hydrogens, such as a hydroxyl group, for example, to form a covalent bond under suitable reaction conditions.

Suitable isocyanate-functional compounds that may be used in the compositions described herein include, without limitation, aliphatic, cycloaliphatic, aromatic, di-, tri-, or polyvalent isocyanates, and the like. Exemplary isocyanate-functional components include 2,4-toluene diisocyanate (TDI), hexamethylene diisocyanate (HDI), polymethylene polyphenyl diisocyanate, isophorone diisocyanate, methylene diphenyl diisocyanate, cyclic trimers, cocyclic trimers, or mixtures thereof. In a preferred aspect, the isocyanate-functional component is a trimer. Examples of suitable trimers include, without limitation, trimerization products prepared from on average three diisocyanate molecules or a trimer prepared from on average three moles of diisocyanate (e.g., HDI) reacted with one mole of another compound such as a triol (e.g., trimethylolpropane). A particularly preferred isocyanate-functional component is hexamethylene diisocyanate trimer.

In a conventional polyurethane system, isocyanate functional groups react with other active hydrogen-containing functional groups, such as hydroxyl groups, for example, in a stoichiometric or 1:1 ratio, i.e. an isocyanate index of 1. Without limiting to theory, it is believed that the properties of a polyurethane system will change with the isocyanate index, and therefore, in some cases, the polyurethane is overindexed. By "overindexed" is meant that the polyurethane includes a molar excess of reactive isocyanate functional groups relative to the other functional group, e.g., hydroxyl groups, with which the isocyanate reacts. The molar excess of reactive isocyanate groups is then available for further reaction. The overindexed polyurethane may offer certain performance advantages over conventional polyurethane systems. For example, when the polyurethane described herein is used in a recoat operation, the molar excess of reactive isocyanate groups may react with urethane or urea groups present on an aged two-component polyurethane coating to form a biuret or an allophanate respectively. The formation of the biuret or the allophanate helps improve adhesion of the new topcoat to the aged coating.

Accordingly, in an embodiment, the polyurethane coating composition described herein is overindexed. In an aspect, the composition has an isocyanate index of preferably at least 1.5, preferably at least 2.0. In an aspect, the composition has an isocyanate index of preferably at 1.5 to 5.0, more preferably 2.0 to 5.0, or even more preferably 2.0 to 4.0.

In an embodiment, the composition described herein includes at least one isocyanate-functional component with reactive isocyanate groups. These reactive isocyanate groups react with one or more multifunctional polyol components having a plurality of reactive hydroxyl groups. Suitable polyols include, for example, polyether polyols, polyester polyols, acrylic polyols, and the like. Polyester polyols and acrylic polyols are particularly preferred.

Suitable acrylic polyols include, for example, compounds derived from ethylenically unsaturated hydroxyl-functional monomers. These include, without limitation, hydroxyalkyl acrylates and methacrylates, including, for example, hydroxyethyl acrylate, hydroxyethyl methacrylate, hydroxypropyl acrylate, hydroxypropyl methacrylate, hydroxybutyl acrylate, hydroxybutyl methacrylate, and mixtures thereof. Acrylic polyols may also be derived by copolymerization of hydroxyalkyl acrylates and methacrylates with ethylenically unsaturated monomers including, for example, styrene, α-methyl styrene, α-methyl chlorostyrene, 1,3-butadiene, acrylamide, acrylonitrile, methacrylonitrile, vinyl butyrate, vinyl acetate, allyl chloride, divinyl benzene, diallyl itaconate, and mixtures thereof. These other ethylenically unsaturated monomers can be used in a mixture with one or more of the above-mentioned alkyl acrylates and methacrylates. An acrylic copolymer can also include minor amounts, for example, from 1 percent to 10 percent by weight of an alpha, beta-ethylenically unsaturated carboxylic acid such as acrylic acid or methacrylic acid.

Suitable polyester polyols include, for example, the conventional polycondensates of diols and also optionally triols and tetraols and of dicarboxylic and also optionally tricarboxylic and tetracarboxylic acids or hydroxycarboxylic acids or lactones, caprolactones, and the like. In place of the free polycarboxylic acids it is also possible to use the corresponding polycarboxylic anhydrides or corresponding polycarboxylic esters of lower alcohols to prepare the polyesters.

Examples of suitable diols include, without limitation, ethylene glycol, butylene glycol, diethylene glycol, triethylene glycol, polyalkylene glycols such as polyethylene glycol, and also 1,2-propanediol, 1,3-propanediol, butane-1,3-diol, butane-1,4-diol, hexane-1,6-diol and isomers, neopentyl glycol or hydroxypivalic acid neopentyl glycol ester. In addition it is also possible for polyols such as trimethylolpropane, glycerol, erythritol, pentaerythritol, trimethylolbenzene or trishydroxyethyl-isocyanurate to be used.

Dicarboxylic acids which can be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and/or 2,2-dimethylsuccinic acid. The corresponding anhydrides are another possible acid source for use.

In a preferred embodiment, the polyester polyol described herein is a product of the reaction between a polyhydroxyl compound, i.e. a triol as described above, for example, and a lactone such as ε-caprolactone, for example.

The polyester polyol component as described herein is a component with glass transition temperature (Tg) of preferably no more than about 20° C., more preferably no more than 0° C., no more than −10° C., no more than −20° C., or even more preferably no more than about −40° C. In a preferred aspect, the polyester polyol described herein has Tg of 25 to −70° C., more preferably, 0 to −70° C., and even more preferably, −10° C. to −70° C.

The polyester polyol component as described herein is a component with a low hydroxyl equivalent weight of less than about 600 g/mol, preferably less than 400 g/mol, and even more preferably, less than 200 g/mol. In a preferred aspect, the polyester polyol described herein has hydroxyl equivalent weight between about 150 and 300, preferably 175 to 275 g/mol.

In an aspect, the polyester polyol component described herein has functionality of preferably at least 2, more preferably at least 3.

In an embodiment, the polyurethane coating composition described herein may be used in a recoat operation, where the painted surface of a coated article is refinished by applying a new topcoat over an old or aged coating. However, a new topcoat, particularly a polyurethane topcoat, may not adhere well to the aged coating due to various surface features of the aged coating, including chalking, surface micropores, entrapped water, and the like.

Conventionally, to improve adhesion of the new topcoat, the aged coating is mechanically abraded before applying the new polyurethane topcoat. This is typically accomplished by scuffing or sanding the surface. However, where the coated article includes a large surface to be refinished, scuffing or sanding can be time-consuming and may not produce uniform adhesion with the new topcoat. In addition, the processes typically used for mechanically abrading the aged coating will release particulate matter and create potential environmental or health hazards.

Where mechanical abrasion of the surface is not convenient or suggested, a tiecoat composition may be applied between the aged coating and a subsequently applied topcoat. Conventionally, tiecoat compositions have included chlorinated polyolefins such as those described in US 2004/0190216, incorporated herein by reference.

The polyurethane coating composition described herein may be used as a tiecoat composition in a recoat or refinish process. The aged coating has an isocyanate index of about 1.05 to 1.50 when first applied. Over time, as the coating ages, the coating surface includes both urethane and urea functional groups, both of which have active hydrogen that can react with isocyanate-functional reactive groups.

Because the composition described herein is overindexed, a molar excess of isocyanate-functional reactive groups are left unreacted after the reaction of the isocyanate-functional component with the polyol component to form the polyurethane. These unreacted isocyanate groups react covalently with the urethane and/or urea functional groups on the aged coating's surface to produce either allophanate (with urethane) or biuret (with urea). This reaction is slower than the reaction of the isocyanate-functional component with a polyol component or the reaction of moisture with the isocyanate-functional component to ultimately form urea. Without limiting to theory, it is believed that the molar excess of isocyanate in the overindexed polyurethane results in unreacted isocyanate in the interlayer for sufficient time to covalently react with the urethane and urea functional groups present on the surface of the aged coating to form allophanate and biuret respectively. This covalent bond formation at the interlayer leads to improved adhesion of the newly applied topcoat to the aged coating.

The polyurethane composition described herein may also include a relatively high content of urethane, urea, isocyanurate, aromatic polymeric repeat units, and the like, because of the high isocyanate index. Without limiting to theory, it is believed that the high content of these repeat units in the polyurethane composition described herein leads to increased dipole-dipole interactions and increased hydrogen bonding, leading to improved adhesion between the aged coating and the newly applied topcoat.

In an embodiment, the coating composition described herein may be used to extend the recoat window for a refinish operation even in the absence of mechanical abrasion or in the absence of a tiecoat. By "recoat window" is meant the short window of time within which a new coating must be applied over the tie coat or over another coating. For example, a traditional polyurethane coating can be modified to provide better intercoat adhesion even in the absence of a tiecoat layer, as long as the polyurethane has an isocyanate index greater than about 1.5. Careful selection of the polyol with respect to the Tg and the hydroxyl number, careful selection of the isocyanate with respect to the index, and careful selection of one or more appropriate catalysts can help improve recoat adhesion and/or extend the recoat window. Without limiting to theory, it is believed that a combination of high index (i.e. overindexing) of the isocyanate component and low Tg of the polyester polyol component contribute to the improved adhesion seen with the composition described herein.

In an embodiment, the coating composition described herein may include one or more components that can catalyze the reaction between isocyanate-functional reactive groups and the urethane or urea groups to form allophanate or biuret. Suitable examples include, without limitation, amine catalysts (including tertiary amine catalysts), metal salts (including, for example, zinc salts, cobalt salts, lead salts, tin salts, and the like), metal alkoxylates (including, for example, zinc alkoxylate, cobalt alkoxylate, tin alkoxylate, and the like), metal esters (including, for example, zinc acetylacetonate, cobalt acetylacetonate, lead acetylacetonate, tin acetylacetonate, and the like), metal naphthenates (including zinc naphthenate, cobalt naphthenate, lead naphthenate, tin naphthenate, and the like), butyl stannoic acid, dibutyl tin dilaurate, and combinations thereof. Conventionally, cobalt catalysts are not used in the types of reactions, but were found to be effective in catalyzing the allophanate/biuret formation reactions described herein.

In an aspect, the one or more catalysts used herein are commercially available, including for example, the following: DABCO NE1070, DABCO RE530, DABCO 33 LV, DABCO T-12, POLYCAT 8 (all from Air Products), DUROCT Cobalt 12% NX (Dura Chemicals), and mixtures or combinations thereof.

In an embodiment, the coating composition described herein may further include other components intended to improve adhesion or extend the recoat window. For example, hydrophobic tail solvents and moisture scavengers (e.g., oxazolidine moisture scavengers such as INCOZOL LV (Incorez)) can be included in the composition to protect the tiecoat from moisture in the environment and thereby increase the recoat window.

In an embodiment, the coating composition described herein may include a solvent. Suitable solvents may be aqueous (e.g., solvents including from about 50 to about 100% water), organic, or mixtures thereof. Suitable examples of organic solvents include, without limitation, aliphatic solvents, aromatic and/or alkylated aromatic solvents (e.g., toluene, xylene, and the like), alcohols (e.g., isopropanol), acetates (e.g., methoxy propanol acetate, butyl acetate, isobutyl acetate, and the like), esters, ketones (e.g., methyl ethyl ketone, methyl amyl ketone, and the like), glycol ethers, glycyl ether esters, and mixtures or combinations thereof. In an aspect, the coating composition described herein has a low volatile organic compound (VOC) content, preferably less than 400 g/L, more preferably less than 300 g/L, and most preferably less than 250 g/L.

The amount of the urethane polymer in the composition described herein may vary depending on a variety of considerations such as, for example, the method of application, the presence of other film-forming materials, whether the coating composition is water-based or solvent-based, etc.

For liquid-based coating compositions, the urethane composition described herein will typically constitute at least 10 wt %, more typically at least 30 wt %, and even more typically at least 50 wt % of the coating composition, based on the total weight of resin solids in the coating composition. Alternatively, for liquid-based coating compositions, the urethane composition described herein preferably constitutes less than 50 wt %, more preferably less than 40 wt %, and even more preferably, less than 30 wt % of the coating composition, based on the total weight of resin solids in the coating composition. In a preferred aspect, the urethane composition described herein constitutes about 10 to 50 wt %, preferably 15 to 40 wt %, more preferably 20 to 30 wt % of the coating composition, based on the total weight of resin solids in the coating composition.

The coating composition described herein may also include other optional ingredients that do not adversely affect the coating composition or a cured coating composition resulting therefrom. Such optional ingredients are typically included in a coating composition to enhance coating aesthetics; to facilitate manufacturing, processing, handling, and application of the composition; and to further improve a particular functional property of a coating composition or a cured coating composition resulting therefrom. For example, the composition described herein invention may optionally include fillers, catalysts, lubricants, pigments, surfactants, dyes, colorants, toners, coalescents, extenders, anticorrosion agents, flow control agents, thixotropic agents, dispersing agents, antioxidants, adhesion promoters, light stabilizers, and mixtures thereof, as required to provide the desired film properties. Each optional ingredient is preferably included in a sufficient amount to serve its intended purpose, but not in such an amount to adversely affect a coating composition or a cured coating composition resulting therefrom.

Useful optional ingredients include pigments, such as, for example, titanium dioxide, iron oxide yellow, and the like. Suitable pigments for use with the composition described herein are known to those of skill in the art, and may be varied for a desired coating color or appearance. If used, a pigment is present in the coating composition in an amount of no greater than 70 wt %, more preferably no greater than 50 wt %, and even more preferably no greater than 40 wt %, based on the total weight of solids in the coating composition. Wetting agents, dispersing agents and surfactants may be optionally added to the coating composition to aid in flow and wetting of the substrate. Examples of surfactants, include, but are not limited to, nonylphenol polyethers and salts and similar surfactants known to persons skilled in the art. If used, a surfactant is preferably present in an amount of at least 0.01 wt-%, and more preferably at least 0.1 wt-%, based on the weight of resin solids. If used, a surfactant is preferably present in an amount no greater than 10 wt-%, and more preferably no greater than 5 wt-%, based on the weight of resin solids.

The coating thickness of a particular layer and the overall coating system will vary depending upon the coating material used, the substrate, the coating application method, and the end use for the coated article. When used as a tiecoat, the thickness of the applied coating film is preferably about 0.05 to 3.0 mil (1.27 to 75 micron), more preferably 0.1 to 1.0 mil (2.5 to 25 micron).

The coating composition of the present invention may be applied to a substrate either prior to, or after, the substrate is formed into an article.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. The cure conditions will vary depending upon the method of application and the intended end use. The curing process may be performed at any suitable temperature.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test Methods

Unless indicated otherwise, the following test methods were used in the Examples that follow.
Laboratory Cyclic Corrosion Test
Cyclic corrosion is tested using a standard method, i.e. the Society of Automotive Engineers (SAE) Surface Vehicle Standard J2334 Cosmetic Corrosion Lab Test. This test is cyclic in nature, i.e. test specimens are exposed to changing climates over time. As used herein, test specimens were subjected to 40 repeating cycles of exposure water/humidity, salt spray, and air drying at temperatures provided in the test method.
Adhesion Test
Adhesion testing is performed to assess whether the coating adheres to the coated substrate. The adhesion test was performed according to the tests described below.
  (i) ASTM D 3359—Test Method A (X-cut): A mark in the shape of an X is cut through a cured coating film applied to a metal substrate. Pressure-sensitive tap (SCOTCH 610 tape, 3M (Minnesota)) is applied over the cut and then removed. Adhesion is generally rated on a scale of 0 A to 5 A, where 5 A represents no paint lost from the X-cut when the tape is removed, and 0 A represents significant (i.e. at least 65%) paint lost from the X-cut when the tape is removed. Adhesion ratings of 5 A, preferably no less than 4 A, are typically desired for commercially viable coatings.
  (ii) ASTM D3359—Test Method B (crosshatch): A crosshatch pattern is cut into the coating using either six or eleven cuts. Adhesion is generally rated on a scale of OB to 5B, wherein a rating of "5" indicates no adhesion failure, i.e. no loss of paint from the crosshatch, a rating of "2" indicates 15 to 35% paint loss from the crosshatch, and a rating of "0" indicates greater than 65% paint loss from the crosshatch. Adhesion ratings of 5B, preferably no less than 4B, are typically desired for commercially viable coatings.
Impact Resistance Test
The direct and reverse impact resistance of cured coatings is tested using method described in ASTM D2794 (Standard Test Method for Resistance of Organic Coatings to the Effects of Rapid Deformation). Briefly, the coatings to be tested are applied to metal panels and cured. A standard weight is dropped a specific distance to strike an indenter that deforms the cured coating and the substrate to which it is applied. Results are expressed as the weight (in lb) dropped when the coating fails, typically by cracking.

Flexibility

The flexibility of cured coatings prepared from the composition described herein is tested using the mandrel bend test, as described in ASTM D522 (Standard Test Methods for Mandrel Bend Test for Attached Organic Coatings). Results are expressed as the percent to which a coating can be elongated (or bent) before the coating film cracks.

Pencil Hardness

The hardness of cured coatings prepared from the powder composition is tested using the pencil hardness method, as described in ASTM D3363 (Standard Test Method for Film Hardness by Pencil Test). Pencils of varying hardness, from 6B (softest) to 9H (hardest) are used. Results are reported in terms of the hardest pencil that does not scratch or mar the surface. Thus, for example, if a coating does not rupture with a 2H pencil, but ruptures when tested with a 3H pencil, the coating is reported to have a pencil hardness of 2H.

Example 1. Preparation of Urethane Tie Coat Composition #1

A two-component urethane coating composition was made according to the following method. Component A was prepared by combining 91.30 g CAPA 3050 polyester polyol (Perstorp), 73.04 g of methyl amyl ketone, 16.74 g of butyl acetate, 804.86 g of t-butyl acetate, and 11.22 g of 2,4-pentanedione. To this mixture was added 0.32 g of DUROCT Cobalt 12% NX (Dura Chemicals, Emeryville Calif.) and 0.170 g dibutyl tin dilaurate as catalysts, along with 0.46 g COROC A-620-A2 (Arkema) as a flow control agent, and 1.89 g TINUVIN 292 (BASF).

Component B was prepared by combining 321.40 g of TOLONATE HDT 90 polyisocyanate (Vencorex) and 83.40 g of butyl acetate.

Components A and B were then combined to produce the two-component tie coat composition. The composition had 27.28 wt % non-volatile material, 374 g/L VOC and 16 s viscosity as measured using a ZAHN Signature #2 Series Dip Cup (Gardner).

Example 2. Preparation of Urethane Tiecoat Composition #2

A two-component urethane coating composition was made according to the following method. Component A was prepared by combining 126.7 g CAPA 4101polyester polyol (Perstorp), 73.04 g of methyl amyl ketone, 16.74 g of butyl acetate, 769.40 g of t-butyl acetate, and 11.22 g of 2,4-pentanedione. To this mixture was added 0.32 g of DUROCT Cobalt 12% NX (Dura Chemicals, Emeryville Calif.) and 0.17 g dibutyl tin dilaurate as catalysts, along with 0.46 g COROC A-620-A2 (Arkema) as a flow control agent, and 1.89 g TINUVIN 292 (BASF).

Component B was prepared by combining 321.40 g of TOLONATE HDT 90 polyisocyanate (Vencorex) and 83.40 g of butyl acetate.

Components A and B were then combined to produce the two-component tie coat composition. The composition had 29.68% non-volatile material and 356 g/L VOC.

Example 3. Preparation of Urethane Tiecoat Composition #3

A two-component urethane coating composition was made according to the following method. Component A was prepared by combining 91.30 CAPA 3050 polyester polyol (Perstorp), 73.04 g of methyl amyl ketone, 16.74 g of butyl acetate, 774.86 g of t-butyl acetate, and 11.22 g of 2,4-pentanedione. To this mixture was added 0.32 g of DUROCT Cobalt 12% NX (Dura Chemicals, Emeryville Calif.) and 0.170 g dibutyl tin dilaurate as catalysts, along with 30.00 g of CRAYVALLC PA4 BA 20 rheology modifier (Palmer Holland), 0.46 g COROC A-620-A2 (Arkema) as a flow control agent, and 1.89 g TINUVIN 292 (BASF).

Component B was prepared by combining 321.40 g of TOLONATE HDT 90 polyisocyanate (Vencorex) and 83.40 g of butyl acetate.

Components A and B were then combined to produce the two-component tie coat composition. The composition had 27.70 wt % non-volatile material, 392 g/L VOC.

Example 4. Performance Testing

Phosphate-treated cold rolled steel test panels (ACT CRS B1070) were coated with a commercially available primer (Valspar Epoxy Primer EEA 1000) and 2K polyurethane top coat (Valspar KPY0390) and then baked at 82.2° C. (180° F.) for 30 minutes and then aged for a minimum of 30 days at standard conditions of temperature and humidity, i.e. 25 to 27° C. and about 50% relative humidity. The tiecoat composition from Example 1 was then sprayed on to each test panel at a dry film thickness of about 2.5 to 25 micron (0.1 to 1.0 mil). The applied coating was allowed to flash for at least 20 minutes and then coated with a film of the commercially available two-component polyurethane topcoat (Valspar KPY0390). The coating was then air dried or baked at 82.2° C. (180° F.) for 30 minutes. The control coating system was prepared in the equivalent manner without the tiecoat composition.

After aging for seven days, the coated panels were evaluated for various mechanical and physical properties. Results are shown in Table 1.

TABLE 1

Performance Testing Results

| Paint Composition | Ambient Cure | Baked |
|---|---|---|
| Pencil Hardness (ASTM D 3363) | | |
| Example 1 - Control | 2B | 2B |
| Example 1- w/TieCoat | 5H | 5H |
| Adhesion (ASTM D 3359) | | |
| Example 1 - Control | 0B | 0B |
| Example 1- w/TieCoat | 5B | 5B |
| Flexibility (ASTM D 552) (% elongation) | | |
| Example 1 - Control | >32%, No Crack | >32%, No Crack |
| Example 1- w/TieCoat | >32%, No Crack | >32%, No Crack |
| Direct Impact Resistance (ASTM D 2794) (lb) | | |
| Example 1 - Control | ≥40 | ≥40 |
| Example 1- w/TieCoat | ≥40 | ≥40 |
| Reverse Impact Resistance (ASTM D 2794) (lb) | | |
| Example 1 - Control | ≥10 | ≥10 |
| Example 1- w/TieCoat | ≥10 | ≥10 |
| Cyclic Corrosion Test Exposure 40 Cycles (SAE J2334) Max Creep Value Before Scraping | | |
| Example 1 - Control | 5.11 | 3.36 |
| Example 1- w/TieCoat | 2.06 | 2.78 |
| Cyclic Corrosion Test Exposure 40 Cycles (SAE J2334) Average Creep Value Before Scraping | | |

TABLE 1-continued

Performance Testing Results

| Paint Composition | Ambient Cure | Baked |
|---|---|---|
| Example 1 - Control | 2.06 | 1.46 |
| Example 1- w/TieCoat | 1.06 | 1.50 |
| Cyclic Corrosion Test Exposure 40 Cycles (SAE J2334) Max Creep Value After Scraping | | |
| Example 1 - Control | Delamination | Delamination |
| Example 1- w/TieCoat | 2.06 | 1.50 |
| Cyclic Corrosion Test Exposure 40 Cycles (SAE J2334) Average Creep Value After Scraping | | |
| Example 1 - Control | Delamination | Delamination |
| Example 1- w/TieCoat | 1.06 | 1.50 |
| Degree of Rusting (ASTM D610) | | |
| Example 1 - Control | 10 | 10 |
| Example 1- w/TieCoat | 10 | 10 |
| Degree of Blistering (ASTM 714) | | |
| Example 1 - Control | None | None |
| Example 1- w/TieCoat | None | None |

Example 5. Performance Testing

An 18-month old equipment part coated with a commercially available polyurethane topcoat (Valspar KPY 0390) was wiped with a tack cloth, and the tiecoat composition of Example 1 was applied at a wet film thickness of approximately 25.0 micron (1.0 mil). The coated part was allowed to flash for at least 20 minutes and then coated with a new film of the commercially available polyurethane and allowed to dry at ambient temperature and humidity. After aging for seven days, the coated part was tested for various performance characteristics, and demonstrated an adhesion rating of 5 A.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A two-component polyurethane coating composition comprising:
    at least one multifunctional isocyanate component having a plurality of reactive isocyanate groups, wherein the isocyanate index is greater than about 1.5;
    at least one multifunctional polyester polyol component having a plurality of reactive hydroxyl groups, wherein the polyester polyol has Tg of about 25° C. to −70° C.; and
    at least one catalyst capable of catalyzing formation of allophanate or biuret by reaction of the isocyanate component with urethane or urea present on the surface of a coated article.

2. The composition of claim 1, wherein the at least one isocyanate component has isocyanate index of about 1.5 to 5.0.

3. The composition of claim 1, wherein the at least one isocyanate component has isocyanate index of about 2.0 to 4.0.

4. The composition of claim 1, wherein the at least one polyester polyol component has a Tg of about 0° C. to −70° C.

5. The composition of claim 1, wherein the at least one polyester polyol component with Tg of about −10° C. to −70° C.

6. The composition of claim 1, wherein the at least one polyester polyol component has hydroxyl equivalent weight of about 300 g/mol.

7. The composition of claim 1, wherein the at least one polyester polyol component has a functionality of at least 2.

8. The composition of claim 1, wherein the at least one isocyanate component is selected from 2,4-toluenediisocyanate, hexamethylene diisocyanate, isophorone diisocyanate, polymethylene-polyphenyl diisocyanate, methylenediphenyldiisocyanate, cyclic trimers, cocyclic trimers, or mixtures thereof.

9. The composition of claim 1, wherein the at least one polyester polyol is the reaction product of ε-caprolactone with one or more hydroxyl-functional compounds.

10. The composition of claim 9, wherein the one or more hydroxyl-functional compounds are selected from glycerol, trimethylolpropane, neopentyl glycol, diethylene glycol, pentaerythritol, caprolactone-derived triols, and combinations thereof.

11. The composition of claim 1, wherein the at least one catalyst is selected from metal salts, metal carboxylates, alkyl-substituted metal carboxylates, and combinations thereof.

12. The composition of claim 1, wherein the at least one catalyst is selected from amine catalysts, zinc salts, cobalt salts, lead salts, tin salts, zinc alkoxylate, cobalt alkoxylate, tin alkoxylate, zinc acetylacetonate, cobalt acetylacetonate, lead acetylacetonate, tin acetylacetonate, zinc naphthenate, cobalt naphthenate, lead naphthenate, tin naphthenate, butyl stannoic acid, dibutyl tin dilaurate, and combinations thereof.

13. The composition of claim 1, wherein the composition includes less than 250 g/L volatile organic compounds (VOC).

14. The composition of claim 1, wherein a cured coating derived from the composition has cross-hatch adhesion grade of at least 4B as measured by ASTM D3359-95.

15. A multilayer coating system, comprising:
    a first coating wherein the first coating is an aged polyurethane, epoxy, alkyd, or powder coating;
    a second coating wherein the second coating is a polyurethane topcoat; and
    a tie coat disposed between the first and second coating, the tie coat comprising a coating composition including:
        at least one multifunctional isocyanate component having reactive isocyanate groups wherein the isocyanate index is 2.0 to 4.0;
        at least one multifunctional polyester polyol component having reactive hydroxyl groups wherein the polyester polyol has Tg of −10° C. to −70° C.; and
        at least one catalyst, wherein the tie coat has a dry film thickness of about 2.5 to 25 microns (0.1 to 1.0 mils).

16. A method of forming a two-component polyurethane tie coat composition, comprising:
    providing at least one multifunctional isocyanate component having reactive isocyanate groups wherein the isocyanate index is 2.0 to 4.0;

providing at least one multifunctional polyester polyol component having reactive hydroxyl groups wherein the polyester polyol has Tg of −10° C. to −70° C.; and reacting the isocyanate and polyol components in the presence of a catalyst to form the polyurethane tie coat composition.

17. A method of improving adhesion between a first coating and a second coating applied to a substrate, comprising:

applying the first coating to the substrate;

applying a tie coat composition over the first coating wherein the tie coating comprises at least one multifunctional isocyanate component having reactive isocyanate groups with an isocyanate index of 2.0 to 4.0 and at least one multifunctional polyester polyol component having reactive hydroxyl groups wherein the polyester polyol has Tg of −10° C. to −70° C.;

curing the tie coat composition; and applying the second coating over the tie coat, wherein the adhesion between the first and second coating is improved relative to adhesion in the absence of the tie coat.

18. The system of claim 17, wherein the first coating is an aged coating.

19. The system or method of claim 17, wherein the first coating is an aged polyurethane, epoxy, alkyd, or powder coating.

20. The method of claim 17, wherein the second coating is a polyurethane topcoat.

21. The method of claim 17, wherein the tie coat has a dry film thickness of about 2.5 to 25 microns (0.1 to 1.0 mils).

* * * * *